United States Patent
Kim et al.

(10) Patent No.: US 9,584,263 B2
(45) Date of Patent: Feb. 28, 2017

(54) METHOD AND APPARATUS FOR TRANSMITTING/RECEIVING CSI IN CELLULAR COMMUNICATION SYSTEM SUPPORTING CARRIER AGGREGATION

(75) Inventors: Young Bum Kim, Seoul (KR); Joon Young Cho, Suwon-si (KR); Ju Ho Lee, Suwon-si (KR); Jin-Kyu Han, Seoul (KR); Hyoung Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 754 days.

(21) Appl. No.: 13/167,175

(22) Filed: Jun. 23, 2011

(65) Prior Publication Data

US 2011/0319068 A1 Dec. 29, 2011

(30) Foreign Application Priority Data

Jun. 29, 2010 (KR) .................. 10-2010-0061983

(51) Int. Cl.

| | |
|---|---|
| H04B 7/212 | (2006.01) |
| H04W 4/00 | (2009.01) |
| H04J 3/06 | (2006.01) |
| H04L 1/16 | (2006.01) |
| H04L 5/00 | (2006.01) |
| H04W 72/04 | (2009.01) |

(52) U.S. Cl.
CPC ............ *H04L 1/1671* (2013.01); *H04L 5/001* (2013.01); *H04L 5/0053* (2013.01); *H04L 5/0055* (2013.01); *H04L 5/0057* (2013.01); *H04W 72/0406* (2013.01)

(58) Field of Classification Search
CPC .... H04W 72/042; H04W 72/10; H04L 5/0042
USPC ........ 370/324, 329, 330, 337, 350; 455/434
See application file for complete search history.

(56) References Cited

U.S. PATENT DOCUMENTS

| | | | | |
|---|---|---|---|---|
| 2006/0274712 | A1* | 12/2006 | Malladi et al. | 370/345 |
| 2008/0310353 | A1* | 12/2008 | Love et al. | 370/329 |
| 2009/0161654 | A1* | 6/2009 | Cai et al. | 370/350 |
| 2009/0190536 | A1* | 7/2009 | Zhang et al. | 370/329 |
| 2010/0118856 | A1* | 5/2010 | Krishnamurthy et al. | 370/342 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 9)", 3GPP TS 36.213 V9.1.0, Mar. 2010.
Nokia Siemens Networks et al. "CSI reporting for Carrier Aggregation", 3GPP TSG RAN WG1 Meeting #61 bis, R1-103797, Jun. 22, 2010.
Panasonic, "Periodic CQI Reporting for Carrier Aggregation", 3GPP TSG-RAN WG1 Meeting #61bis, R1-103749, Jun. 22, 2010.
Sharp, "Periodic CQI Reporting for Multiple Component Carriers", 3GPP TSG-RAN WG1 Meeting #61bis, R1-103718, Jun. 22, 2010.

* cited by examiner

*Primary Examiner* — Joshua Schwartz
(74) *Attorney, Agent, or Firm* — Jefferson IP Law, LLP

(57) ABSTRACT

A Channel Status Information (CSI) transmission method and apparatus of a terminal are provided for use in a wireless communication system. In the wireless communication system supporting carrier aggregation, the terminal transmits the CSIs of component carriers without conflict of their transmission time points, resulting in an improvement of system performance. In a case where the transmission time points are determined to overlap unavoidably, the terminal transmits the CSI as compressed.

16 Claims, 17 Drawing Sheets

FIG. 10

| CC1 (reference) (k1 bit) | CC2 (k2 bit) | CC3 (k2 bit) | CC4 (k2 bit) | CC5 (k2 bit) |
|---|---|---|---|---|
| (1002) | (1004) | (1006) | (1008) | (1010) |

METHOD AND APPARATUS FOR TRANSMITTING/RECEIVING CSI IN CELLULAR COMMUNICATION SYSTEM SUPPORTING CARRIER AGGREGATION

PRIORITY

This application claims the benefit under 35 U.S.C. §119 (a) of a Korean patent application filed on Jun. 29, 2010 in the Korean Intellectual Property Office and assigned Serial No. 10-2010-0061983, the entire disclosure of which is hereby incorporated by reference.

BACKGROUND OF THE INVENTION

1. Field of the Invention

The present invention relates to a cellular communication system. More particularly, the present invention relates to a Channel Status Information (CSI) transmission method and apparatus of a terminal in a cellular communication system.

2. Description of the Related Art

Recently, research has been conducted on the Orthogonal Frequency Division Multiple Access (OFDMA) and Single Carrier Frequency Division Multiple Access (SC-FDMA) as useful schemes for high speed data transmission over a radio channel. In such multiple access schemes, the user-specific data and/or control information are mapped to time-frequency resources without overlap from each other, i.e., maintaining orthogonality, to identify the user-specific data and/or control information.

In a cellular communication system, one of the significant factors for providing high-speed wireless data service is bandwidth scalability for dynamic resource allocation. For example, a Long Term Evolution (LTE) system can support the bandwidths of 20/15/10/5/3/1.4 MHz. The carriers can provide services with at least one of the bandwidths, and the user equipment can have different capabilities such that some might support only 1.4 MHz bandwidth, and others might support up to 20 MHz bandwidth. The LTE-Advanced (LTE-A) system, aiming at achieving the requirements of the International Mobile Telecommunications-Advanced (IMT-Advanced) service, can provide broadband service by aggregating carriers up to 100 MHz.

The LTE-A system uses more bandwidth than the LTE system for high-speed data transmission. Simultaneously, the LTE-A system should be backward compatible with LTE system for supporting LTE User Equipment (UE). That is, the LTE-A system should be configured such that the LTE UEs can access the services provided by the LTE-A system. The LTE-A system supports up to 100 MHz bandwidth by aggregating two or more LTE subbands or Component Carriers (CC). The LTE-A system aggregates some component carriers and generates and transmits data per component carrier. Accordingly, the LTE transmission process can be used per component carrier to achieve the high speed data transmission of the LTE-A system.

In the LTE-A system supporting carrier aggregation, the Channel State Information (CSI) configuration information should be defined per component carrier and, in this case, the CSI transmission timings of UE for the component carriers should be guaranteed not conflict with each other so as to improve the system performance.

In order to address the above problems, there is a need to provide a CSI transmission method and apparatus of a UE in a wireless communication system supporting carrier aggregation that is capable of protecting conflict of CSI transmission timings, resulting in improvement of system performance. Also, there is a need to provide a CSI transmission method and apparatus of a UE in a wireless communication system supporting carrier aggregation that is capable of compressing the CSI to be transmitted when the CSI transmission timings are overlapped unavoidably.

SUMMARY OF THE INVENTION

Aspects of the present invention are to address at least the above-mentioned problems and/or disadvantages and to provide at least the advantages described below. Accordingly, an aspect of the present invention is to provide a Channel State Information (CSI) transmission method and apparatus of a User Equipment (UE) in a wireless communication system such as Long Term Evolution-Advanced (LTE-A) supporting carrier aggregation that is capable of guaranteeing avoidance of conflict of the CSI transmission timings on the component carriers, resulting in improvement of system performance.

It is another aspect of the present invention to provide a CSI transmission method and apparatus of a UE in a wireless communication system that is capable of transmitting the CSI in compressed format when the CSI transmission timings are overlapped unavoidably, resulting in improvement of system performance.

In accordance with an aspect of the present invention, a channel status information transmission method of a terminal in a wireless communication system is provided. The channel status information transmission method includes receiving configuration information for component carriers aggregated from a base station, determining whether transmission time points of at least two of the component carriers are identical with each other, by analyzing the configuration information, and transmitting, when transmission time points of at least two of the component carriers are identical with each other, a channel status information of a component carrier having a highest priority among the at least two component carriers at the transmission time point.

In accordance with another aspect of the present invention, a channel status information reception method of a base station in a wireless communication system is provided. The channel status information reception method includes transmitting configuration information on a plurality of component carriers aggregated, and receiving, when transmission time points of at least two of the component carriers are identical with each other, a channel status information of a component carrier having a highest priority among the at least two component carriers at the transmission time point.

In accordance with another aspect of the present invention, an apparatus for transmitting channel status information for a terminal in a wireless communication system is provided. The apparatus includes a controller which receives configuration information for component carriers aggregated from a base station and determines whether transmission time points of at least two of the component carriers are identical with each other, by analyzing the configuration information, and a formatter which transmits, when transmission time points of at least two of the component carriers are identical with each other, a channel status information of a component carrier having a highest priority among the at least two component carriers at the transmission time point.

In accordance with another aspect of the present invention, an apparatus for receiving channel status information from a base station in a wireless communication system is provided. The apparatus includes a scheduler which transmits configuration information for component carriers aggregated, and a controller which receives, when transmission time points of at least two of the component carriers are identical with each other, a channel status information of a component carrier having a highest priority among the at least two component carriers at the transmission time point.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 10 is a diagram illustrating a data format of CSIs for component carriers for use in a CSI transmission method according to a third exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the exemplary embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the exemplary embodiments of the Advanced Evolved-Universal Terrestrial Radio Access (E-UTRA) or Long Term Evolution-Advanced (LTE-A) system supporting carrier aggregation, it will be understood by those skilled in the art that the present invention can be applied even to other communication systems having the similar technical background and channel format, with a slight modification, without departing from the spirit and scope of the present invention. For example, the present invention can be applied to the multi-carrier High Speed Packet Access (HSPA) supporting carrier aggregation.

Figure 1:
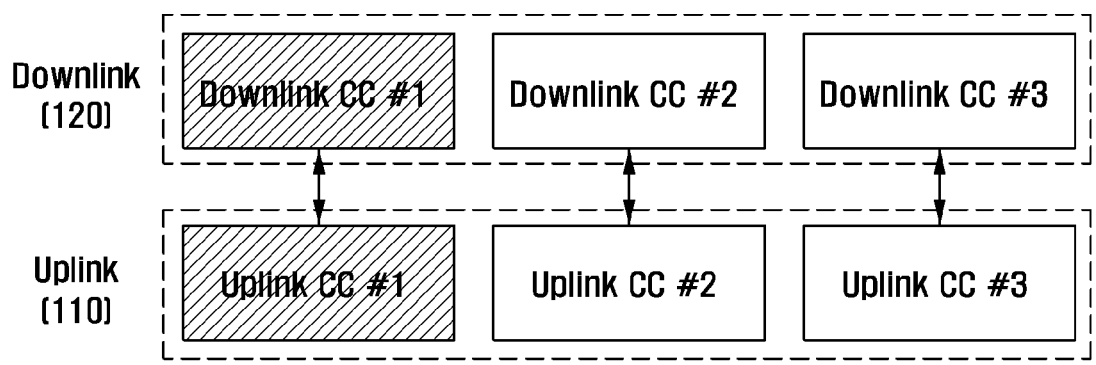
FIG. 1 is a diagram illustrating a principle of carrier aggregation for use in a cellular communication system according to an exemplary embodiment of the present invention.

FIG. 1 is a diagram illustrating a principle of carrier aggregation for use in a cellular communication system according to an exemplary embodiment of the present invention.

FIG. 1 shows an exemplary case of an LTE-A system in which three component carriers are aggregated in each of uplink and downlink. In the present disclosure, the term 'uplink' denotes the radio link for a User Equipment (UE) or Mobile Station (MS) to transmit data and/or control signal to an evolved Node B (eNB) or Base Station (BS), and the term 'downlink' denotes the radio link for the eNB or BS to transmit data and/or control signals to the UE or MS. Among the aggregated component carriers, a representative carrier is selected as a primary carrier or Primary Component Carrier (PCC) or anchor component carrier. A component carrier not selected as a primary carrier is referred to as a secondary carrier or a Secondary Component Carrier (SCC) or a non-anchor component carrier. The eNB notifies the UE of the component carrier to be configured as the primary carrier via higher layer signaling. It is assumed that the number of component carriers to be aggregated is configured by higher layer signaling.

In the case of downlink, the initial system information or higher layer signaling is transmitted on the component carrier configured as the primary carrier, and the primary carrier can be a reference component carrier for controlling mobility of the UE. In case of uplink, the component carrier on which the control channels carrying Hybrid Automatic Repeat Request-Acknowledgement (HARQ-ACK) or Channel Quality Indication (CQI) of the UE can be selected as the uplink primary carrier.

Referring to FIG. 1, three component carriers are aggregated for uplink 110 and downlink 120 respectively, and the downlink component carrier 1 and the uplink component carrier 1 are configured as the uplink and downlink primary carriers respectively. Although the uplink component carriers and the downlink component carriers are configured symmetrically in number (symmetric carrier aggregation) in FIG. 1, the numbers of the aggregated uplink and downlink component carriers can differ from each other (asymmetric carrier aggregation).

The Channel State Information (CSI) includes Channel Quality Indicator (CQI), Precoding Matrix Indicator (PMI), Rank Indicator (RI), and downlink channel coefficient. If there is no data to be transmitted in uplink, the UE transmits the CSI through Physical Uplink Control Channel (PUCCH) and, otherwise if there is data to be transmitted in uplink, transmits the CSI through Physical Uplink Shared Channel (PUSCH). The eNB sets the Modulation and Coding Scheme (MCS) for transmitting data to an appropriate value based on the CQI transmitted by the UE so as to fulfill a predetermined reception performance for the data.

CQI denotes the Signal to Interference and Noise Ratio (SINR) of a system bandwidth (wideband) or partial bandwidth (subband) and is typically expressed in the form of MCS for satisfying a predetermined data reception performance. PMI/RI provides precoding and rank information used for data transmission of the eNB using multiple antennas in the system supporting Multiple Input Multiple Output (MIMO). In the case of the signal indicating the downlink channel coefficient, it provides more detailed channel status information as compared to the CSI but increases uplink overhead.

In order to transmit the CSI to the eNB, the UE is informed about the CSI configuration information such as reporting mode on how to feed back which information, resource to be used for transmission, and transmission cycle by higher layer signaling from the eNB in advance.

Exemplary embodiments of the present invention are to improve the system performance by guaranteeing avoidance of conflicts of the CSI transmission timings on the individual component carriers in the wireless communication system supporting wider bandwidth by carrier aggregation. In a case where the conflict of the CSI transmission timings on the component carriers is unavoidable, the UE compresses the CSI to be transmitted.

A description is made of the CSI transmission method for the system supporting carrier aggregation according to exemplary embodiments of the present invention.

Figure 2:
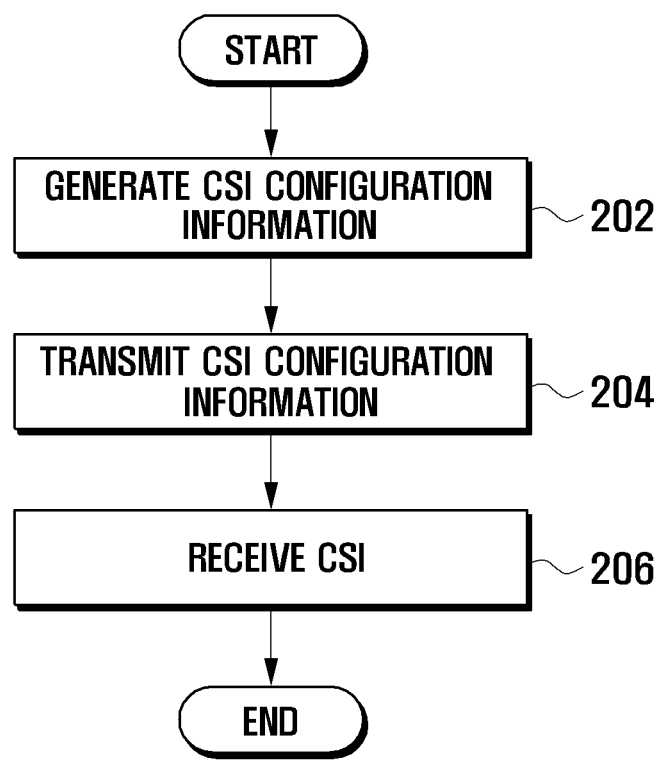
FIG. 2 is a flowchart illustrating a procedure of an evolved Node B (eNB) for supporting the Channel State Information (CSI) transmission method in a cellular communication system according to an exemplary embodiment of the present invention.

FIG. 2 is a flowchart illustrating a procedure of an eNB for supporting a CSI transmission method in a cellular communication system according to an exemplary embodiment of the present invention.

Referring to FIG. 2, the eNB generates the CSI configuration information for the UE at step 202. That is, the eNB generates the CSI configuration information for determining the CSI transmission timings of the individual component carriers that are aggregated for the UE. At this time, the eNB can assign a CSI transmission pattern to the UE and generates the CSI configuration information corresponding to the CSI transmission pattern. That is, the eNB assigns the CSI transmission pattern to the UE for avoiding conflict of the CSIs of the component carriers. Here, the CSI configuration information can include at least one of a transmission period of the CSI transmission pattern arranging transmission timings of the CSIs of component carriers, an interval between the start point of the transmission period and the initial transmission time point of the CSI in the transmission period, an interval between CSIs in the transmission period, and the transmission time point per CSI in the transmission period. The CSI configuration information can be prepared differently depending on the exemplary embodiment of the present invention and detailed descriptions are made later of the CSI configuration information according to the exemplary embodiments of the present invention.

Next, the eNB transmits the CSI configuration information to the UE at step 204. At this time, the CSI configuration information can be transmitted via higher layer signaling. Afterward, the eNB receives CSI per component carrier from the eNB at step 206. At this time, the eNB receives the CSIs at the predetermined transmission timings according to the CSI transmission pattern determined by the CSI configuration information.

Figure 3:
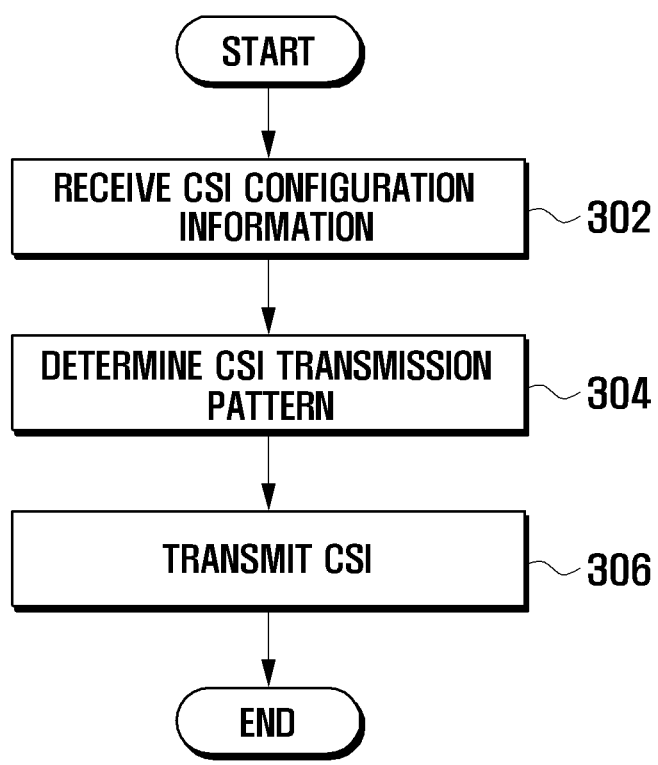
FIG. 3 is a flowchart illustrating a procedure of a User Equipment (UE) for transmitting CSIs in a cellular communication system according to an exemplary embodiment of the present invention.

FIG. 3 is a flowchart illustrating a procedure of a UE for transmitting CSIs in a cellular communication system according to an exemplary embodiment of the present invention.

Referring to FIG. 3, the UE acquires the CSI configuration information from the eNB at step 302. The CSI configuration information is of multiple component carriers aggregated. The UE determines the CSI transmission pattern at step 304 by analyzing the CSI configuration information. The CSI transmission pattern is composed of the transmission time points of the CSIs of component carriers. The CSI transmission pattern is designed such that the CSIs of the component carriers do not conflict with each other. The UE can determine the CSI transmission pattern in various structures according to the exemplary embodiments of the present invention, and a detailed description is made later of the CSI transmission pattern. Next, the UE transmits CSIs to the eNB according to the CSI transmission pattern at step 306. That is, the UE transmits the CSIs at the corresponding transmission time points according to the CSI transmission pattern. At this time, the UE transmits the CSIs of the component carriers through at least one of the uplink component carriers. The CSIs of the component carriers are transmitted so as not to conflict with each other. In a case where the transmission time points of some CSIs are identical with each other, the UE can compress the CSIs of the component carriers through joint coding before transmission.

First Exemplary Embodiment

The first exemplary embodiment proposes a method for avoiding conflict of the transmission time points of the CSIs for different component carriers that the UE feeds back to the eNB in LTE-A system. In this exemplary embodiment, preferred CSI transmission patterns for a UE are proposed.

Figure 4:
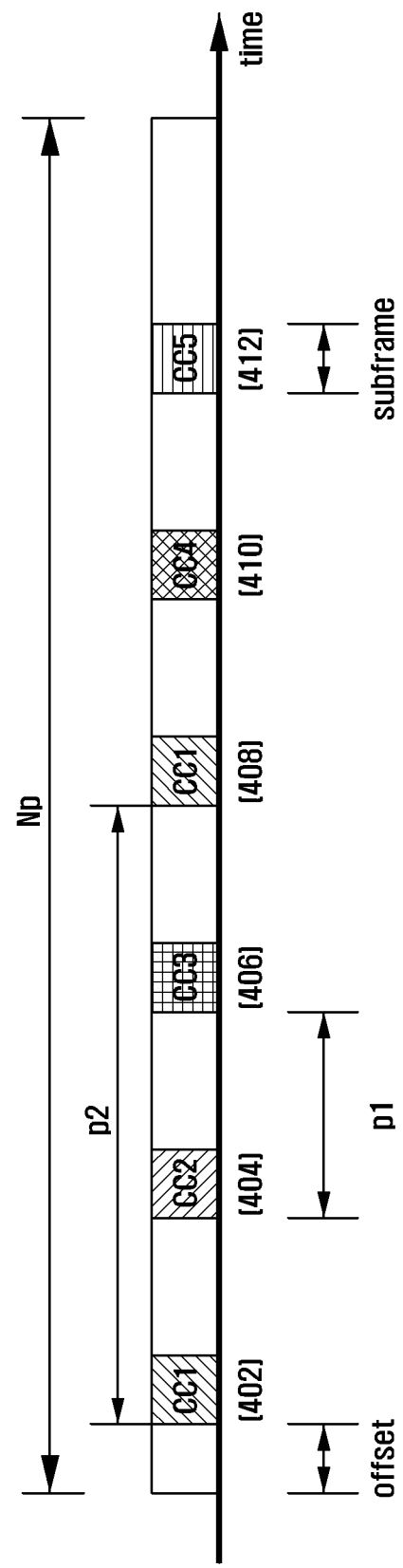
FIG. 4 is a diagram illustrating a principle of avoiding conflict between transmission time points of CSIs of component carriers in a CSI transmission method according to a first exemplary embodiment of the present invention.

FIG. 4 shows a principle of generating and managing CSI configuration information for avoiding conflict between transmission time points of CSIs of component carriers according to a first exemplary embodiment of the present invention.

FIG. 4 is depicted in consideration of the wireless communication system supporting aggregation of up to 5 component carriers of CC1 to CC5. In FIG. 4, the eNB notifies the UE of the CSI configuration information including values of Np, offset, p1, and p2 in advance via higher layer signaling. The CSI per component carrier can include at least one of wideband CQI representing the CQI for the entire bandwidth of each component carrier, subband CQI representing the CQI for part of the component carrier, PMI, and RI. The CSI of each component carrier is transmitted in a subframe. The uplink component carrier for transmitting the CSI of each downlink component carrier thereon in notified to the UE in advance by the eNB, and typically the uplink component carrier corresponding to the downlink carrier is selected for the CSI transmission.

Referring to FIG. 4, the UE configures a set of CSIs of the component carriers (hereinafter, referred to as a CSI set) in a specific pattern and transmits the CSI sets repeatedly at a predetermined period Np. That is, the UE configures a component carrier CSI set {CSI_CC1 402, CSI_CC2 404, CSI_CC3 406, CSI_CC1 408, CSI_CC4 410, CSI_CC5 412} and transmits the component elements of the CSI set in sequence. CSI_CC1 402, CSI_CC2 404, CSI_CC3 406, CSI_CC1 408, CSI_CC4 410, and CSI_CC5 412 means the CSIs on CC1, CC2, CC3, CC1, CC4, and CC5 respectively. Here, 'Np' denotes the transmission period for the UE to transmit the CSI set. In FIG. 4, the parameter 'offset' denotes a number of subframes between the first CSI in the period Np and the start time point of the period Np. 'p1' denotes the interval between the contiguous CSIs in the period Np and is expressed by a number of subframes. In this exemplary embodiment, the CSIs are transmitted at a regular interval.

Within the transmission period Np, a specific component carrier can be configured to be transmitted more frequently as compared to other component carriers, so as to provide more detailed channel status information for the corresponding component carrier, resulting in improvement of accuracy. In the exemplary embodiment of FIG. 4, CC1 is assigned a higher priority such that the CSI of the CC1 is transmitted twice within the transmission period Np. 'p2' denotes the interval between the CSI transmission time points for the component carrier assigned priority within the period Np and is expressed by a number of subframes. Here, p2 can be an integer multiple of p1. The eNB notifies the UE of a number of transmission times of a component carrier and a number of subframes (p2) between the CSI transmissions for the component carrier within the period P2. p1 is determined by equation (1):

$$p1 = \text{floor}(Np/N\_CSI) \quad (1)$$

where N_CSI denotes the total number of CSIs transmitted in the period Np, and floor(x) denotes a maximum integer less than x. N_CSI is determined by the total number of component carriers available for the UE and the number of CSI transmitted additionally within Np. In the exemplary case of FIG. 4, the CSI for CC1 is transmitted one more time within the period Np, N_CSI is 6 (N_CSI=5+1=6). Accordingly, if Np=20, p1=floor(20/6)=3.

The eNB can notify the UE of the transmission order of the CSIs of component carriers within the period Np via explicit signaling. In FIG. 4, the CSI transmission order is {CSI_CC1 402, CSI_CC2 404, CSI_CC3 406, CSI_CC1 408, CSI_CC4 410, CSI_CC5 412}.

The CSI transmission order can be determined based on the frequencies of the component carriers, e.g., ascending order of frequencies. For example, if the frequencies of CC1 to CC5 are CC1<CC2<CC3<CC4<CC5, the CSI transmission order becomes {CSI_CC1 402, CSI_CC2 404, CSI_CC3 406, CSI_CC4 410, CSI_CC5 412}. In a case where the CC1 is assigned a priority to transmit CSI one more time, the CSI_CC1 408 is added after p2 frames from transmission time point of CSI_CC1 402, whereby the final CSI transmission order becomes {CSI_CC1 402, CSI_CC2 404, CSI_CC3 406, CSI_CC1 408, CSI_CC4 410, CSI_CC5 412}.

Although the CSI transmission order repeats at period Np, the transmission patterns of the CSIs for the same component carriers can be changed in every Np. For example, the CSI_CC1 402 transmitted at the first period can carry the wideband CQI of the CC1 while the CSI_CC1 408 transmitted at the second period carries the subband CQI of the CC1.

In order to transmit Np, offset, p1, and p2 as the CSI configuration information, the eNB takes account of the information on the number of component carriers aggregated for the corresponding UE, priority assigned to a component carrier, resource allocated for CSI transmission within the system, and uplink component carrier for CSI transmission.

The first exemplary embodiment can be modified in various manners.

Figure 5:
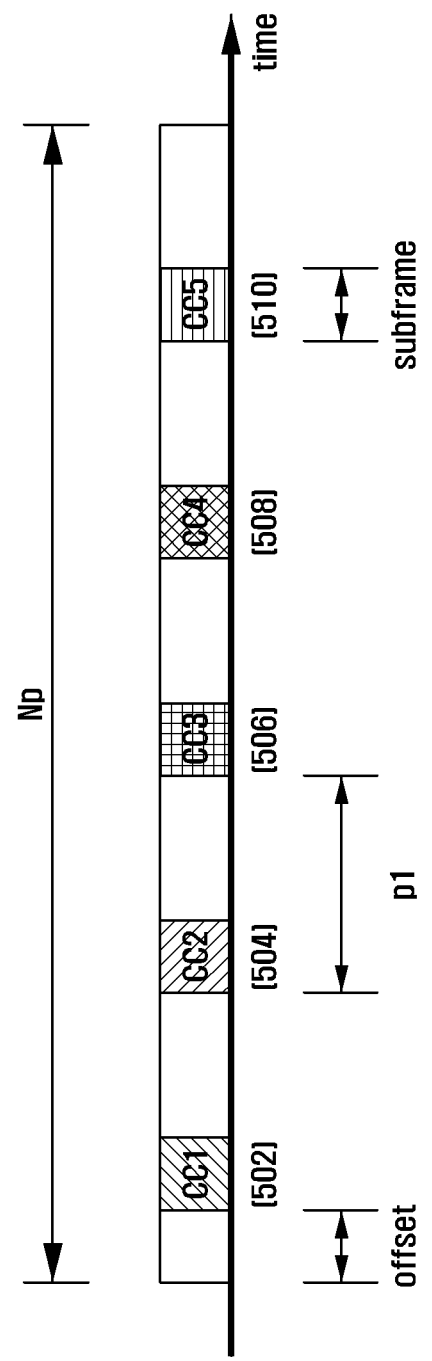
FIG. 5 is a diagram illustrating a principle of avoiding conflict between transmission time points of CSIs of component carriers according to a modified example of the first exemplary embodiment of the present invention.

FIG. 5 is a diagram illustrating a principle of avoiding conflict between the transmission time points of CSIs of component carriers according to a modification of the first exemplary embodiment of the present invention.

Referring to FIG. 5, the CSIs of the component carriers are transmitted evenly without any priority order within the period Np. In the exemplary embodiment of FIG. 5, five component carriers CC1 to CC5 are used for the UE, the transmission period Np is 30 subframes, and CSI of each component carrier is transmitted once within Np (i.e., N_CSI=5). In this case, p1=floor(20/5)=4. The CSI transmission order for the component carriers within Np becomes {CSI_CC1 502, CSI_CC2 504, CSI_CC3 506, CSI_CC4 508, CSI_CC5 510}, the CSI_CC1 502 transmitted first in the transmission period Np is distant as many as 1 subframe (offset=1) from the start point of the transmission period Np.

Figure 6:
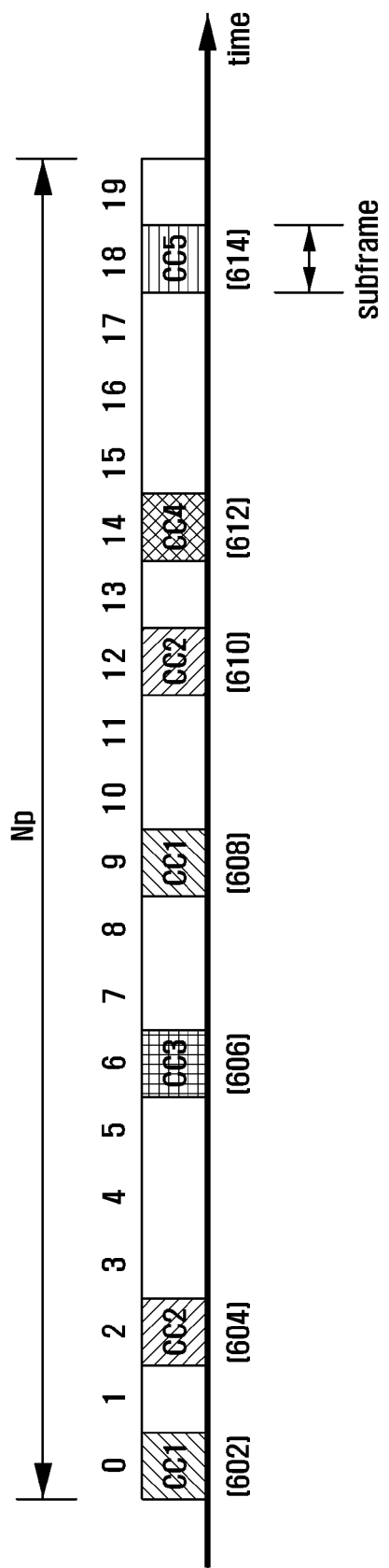
FIG. 6 is a diagram illustrating a principle of avoiding conflict between transmission time points of CSIs of component carriers according to another modified example of the first exemplary embodiment of the present invention.

FIG. 6 is a diagram illustrating a principle of avoiding conflict between transmission time points of CSIs of component carriers according to another modified example of the first exemplary embodiment of the present invention.

Referring to FIG. 6, the CSI transmission time point of each component carrier can be placed a certain subframe within the transmission period Np. That is, the interval between the CSI transmission time points for the component carriers can vary, in contrast to the constant p1 in the cases of FIGS. 4 and 5. The eNB can notify the UE of the component carriers of which CSIs are transmitted and the transmission time points of the CSIs via explicit signaling. For example, if Np=20 and 5 component carriers are used for the UE, the eNB can notify the UE of the transmission time point of the CSIs of the component carriers within the transmission period Np as follows:

CSI_CC1 (602, 608)={0, 9}, CSI_CC2 (604, 610)={2, 12}, CSI_CC3 (606)={6}, CSI_CC4 (612)={14}, CSI_CC5 (614)={18}

That is, the eNB informs of the transmission time points of the CSIs of component carriers with absolute values within the transmission period Np. For example, the eNB can inform that the CSI for component carrier 1 is transmitted in subframe#0 602 and subframe#9 608 within the transmission period Np. Since the CSI transmission time points are explicitly informed to the UE in the exemplary embodiment of FIG. 6, there is no need of the offset used in the exemplary embodiments of FIGS. 4 and 5.

As an exemplary modification of the component carrier CSI transmission position signaling method, it is possible to signal in the form of a bitmap having a length equal to the transmission period Np as follows:

CSI_CC1(602, 608)={1, 0, 0, 0, 0, 0, 0, 0, 0, 1, 0, 0, 0, 0, 0, 0, 0, 0, 0, 0},
CSI_CC2(604, 610)={0, 0, 1, 0, 0, 0, 0, 0, 0, 0, 0, 0, 1, 0, 0, 0, 0, 0, 0, 0},
CSI_CC3(606)={0, 0, 0, 0, 0, 0, 1, 0, 0, 0, 0, 0, 0, 0, 0, 0, 0, 0, 0, 0},
CSI_CC4(612)={0, 0, 0, 0, 0, 0, 0, 0, 0, 0, 0, 0, 0, 0, 1, 0, 0, 0, 0, 0},
CSI_CC5(614)={0, 0, 0, 0, 0, 0, 0, 0, 0, 0, 0, 0, 0, 0, 0, 0, 0, 0, 1, 0}.

In bitmap signaling, each bit indicates the number of a subframe within the transmission period Np, i.e., the bit set to 1 indicates CSI transmission and the bit set to 0 indicates no CSI transmission in that subframe. For example, the CSI_CC2 604 and 610 for the component carrier#2 are transmitted in subframe#2 and subframe#12 within the transmission period Np.

Second Exemplary Embodiment

The second exemplary embodiment proposes another method for avoiding conflict of the transmission time points of the CSIs for different component carriers that the UE feeds back to the eNB in LTE-A system. In this exemplary embodiment, preferred CSI transmission patterns for a UE are proposed.

Figure 7:
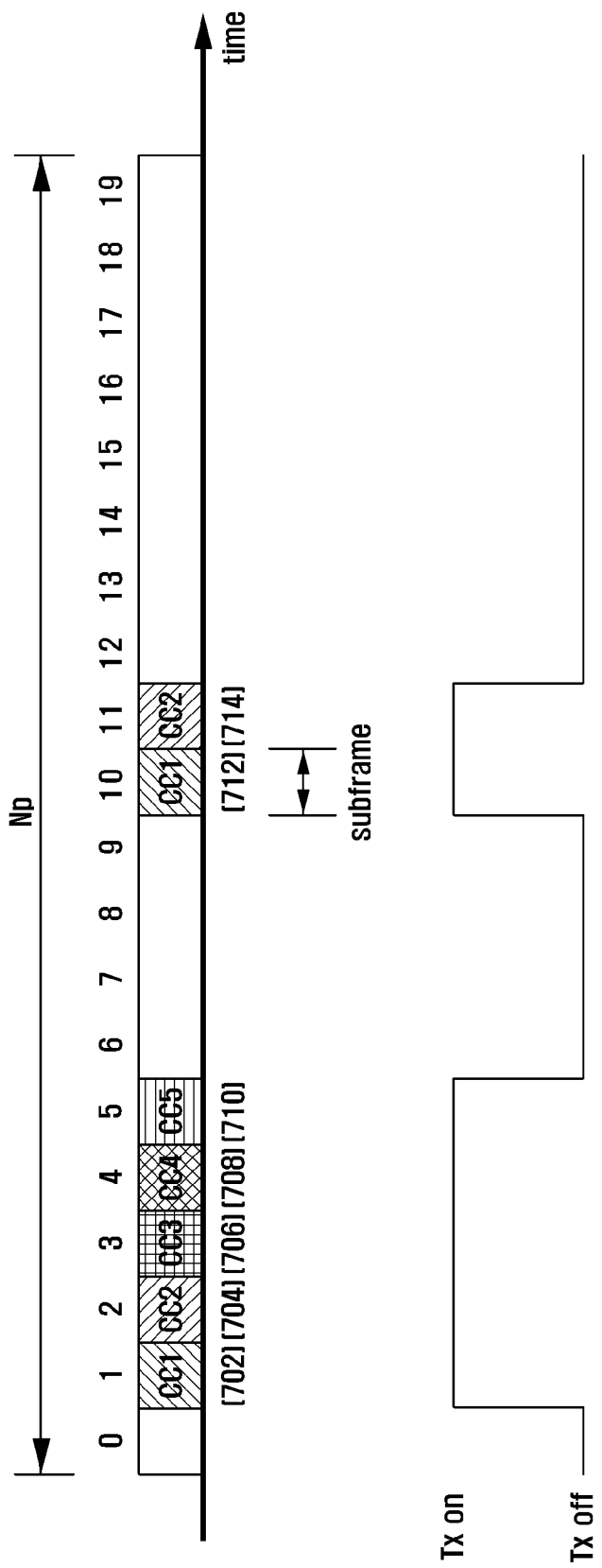
FIG. 7 is a diagram illustrating a principle of avoiding conflict between transmission time points of CSIs of component carriers in the CSI transmission method according to a second exemplary embodiment of the present invention.

FIG. 7 is a diagram illustrating a principle of avoiding conflict between transmission time points of CSIs of component carriers in a CSI transmission method according to a second exemplary embodiment of the present invention.

In the exemplary embodiment of FIG. 7, the CSI transmission time points for the individual component carriers are configured as bursty as possible in contiguous Tx on periods within the transmission period Np. In this manner, the eNB scheduler concentrates the CSI transmission time points of the component carriers on a position to improve scheduling efficiency, and the UE reduces the number of the on/off operations of the UE transmitter so as to improve battery efficiency. The CSI for each component carrier is transmitted once in a subframe.

Referring to the exemplary embodiment of FIG. 7, CSI_CC1 702, CSI_CC2 704, SI_CC3 706, CSI_CC4 708, and CSI_CC5 710 are carried contiguously in the respective subframe#1, subframe#2, subframe#3, subframe#4, and subframe#5 within the transmission period Np, and CSI_CC1 712 and CSI_CC2 714 are assigned priority to be contiguously transmitted in subframe#10 and subframe#11. The CSI transmission time point of each component carrier within the transmission period Np is determined by the eNB as described with reference to FIG. 6 and notified to the UE.

Figure 8:
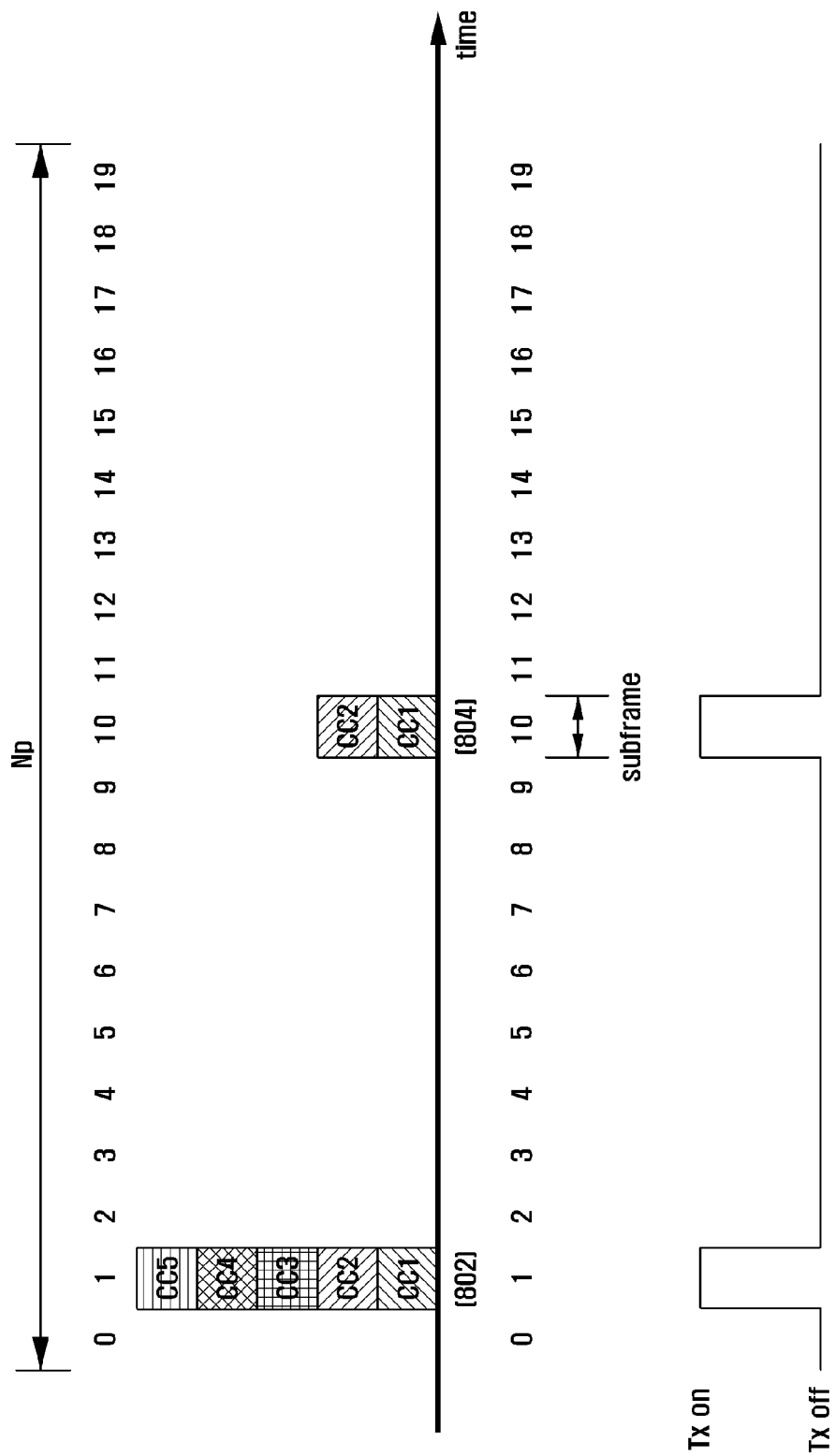
FIG. 8 is a diagram illustrating a principle of avoiding conflict between transmission time points of CSIs of component carriers according to a modified example of the second exemplary embodiment of the present invention.

FIG. 8 is a diagram illustrating a principle of avoiding conflict between transmission time points of CSIs of component carriers according to a modified example of the second exemplary embodiment of the present invention.

In FIG. 8, the eNB performs joint coding on CSI_CC1, CSI_CC2, CSI_CC3, CSI_CC4, and CSI_CC5 such that the CSIs combined into CSI PCC 802 are transmitted simultaneously in subframe#1, and also performs joint coding on the CSI_CC1 and CSI_CC2 assigned priority such that the CSIs combined into CSI NCC 804 are transmitted simultaneously in subframe#10. The CSI PCC 802 and CSI NCC 804 are identical with each other in format and signaled to the UE by the eNB in advance. The total number of bits for CSIs that can be transmitted simultaneously as CSI PCC 802 in subframe#1 can be limited, and FIG. 9 shows the CSI transmission procedure of the UE in such a case.

Figure 9:
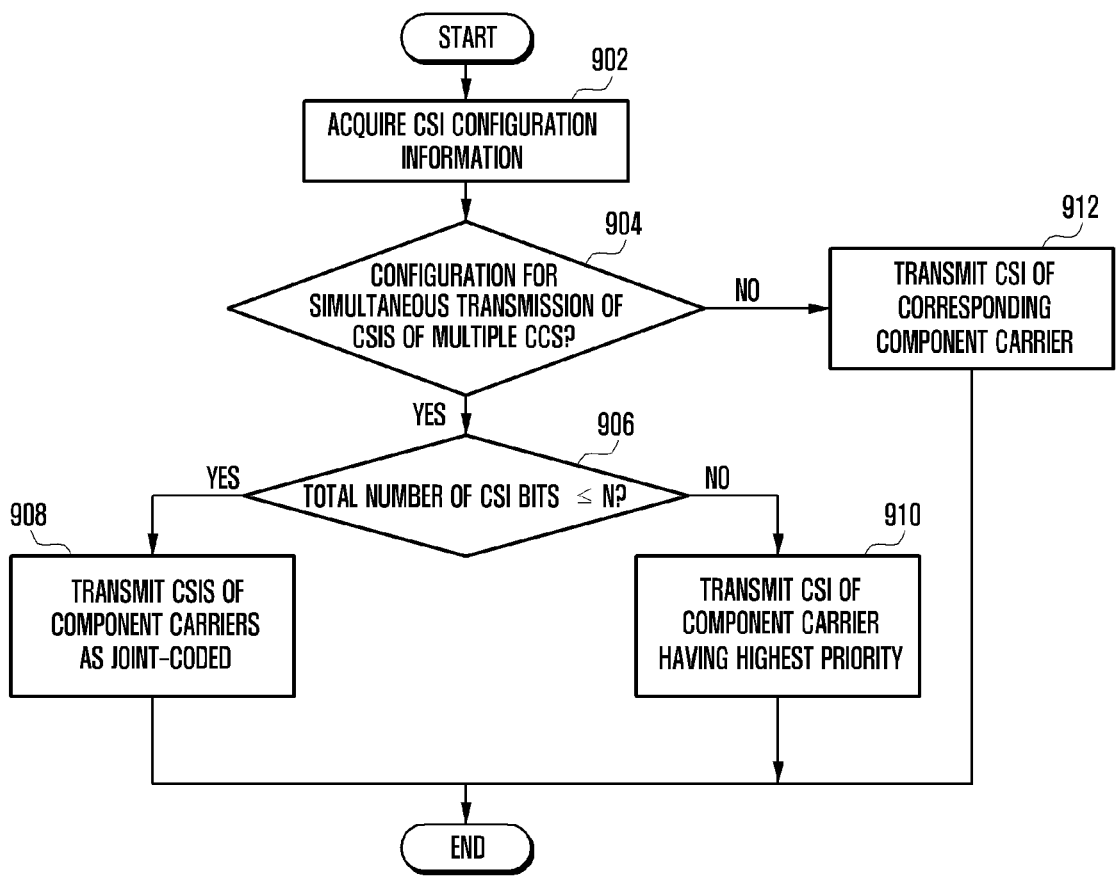
FIG. 9 is a flowchart illustrating a procedure for transmitting CSIs of aggregated component carriers according to a modified example of the second exemplary embodiment of the present invention.

FIG. 9 is a flowchart illustrating a procedure for transmitting CSIs for aggregated component carriers according to a modified example of the second exemplary embodiment of the present invention.

FIG. 9 can be used for explaining steps 304 and 306 of FIG. 3.

Referring to FIG. 9, the UE acquires the CSI configuration information from the eNB at step 902. The CSI configuration information includes Np, offset, CSI transmission time points of individual component carriers, and priorities of the component carriers. The CSI configuration information can be generated for each or all of the component carriers. After acquiring the CSI configuration information, the UE determines whether the CSI configuration information indicates simultaneous transmission of CSIs for multiple component carriers in current subframe#k at step 904. That is, the UE predicts whether the CSI transmission time points will conflict with each other.

If the CSI configuration information indicates multiple component carriers CSI transmission for simultaneous transmission of CSIs in current subframe#k at step 904, the UE calculates a total number of CSI bits for all of the component carriers to be transmitted simultaneously in the subframe#k and compares the total number of CSI bits with a predetermined value N at step 906. If the total number of CSI bits is equal to or less than N, the procedure goes to step 908 and, otherwise, step 910. N denotes a maximum number of CSI bits that can be transmitted simultaneously by the UE in a subframe. At step 908, the UE performs joint coding on the CSIs of the component carries configured to be transmitted simultaneously in the subframe#k and transmits the joint coded CSIs. At step 910, the UE transmits only the CSIs of the component carriers having highest priorities, but not the CSIs of the component carriers having lower priorities.

If the CSI configuration information indicates single component carrier CSI transmission rather than multiple component carriers CSI transmission at step 904, the UE transmits the CSI of the corresponding component carrier at step 912. At this time, the UE can transmit the CSI according to the CSI transmission pattern as shown in FIG. 7. The UE can also transmit the CSI according to one of the CSI transmission patterns as shown in FIGS. 4 to 6.

Third Exemplary Embodiment

The third exemplary embodiment proposes a method for transmitting a total number of CSI bits in compressed format when the transmissions of the CSIs fed back to the eNB are overlapped at a time point. Here, the maximum number of control information bits N that the UE can transmit in a subframe is limited and, in the case of an LTE system, the maximum number of bits N available for transmission of PUCCH is 13.

FIG. 10 is a diagram illustrating a data format of CSIs for component carriers for use in a CSI transmission method according to a third exemplary embodiment of the present invention.

Referring to FIG. 10, the UE transmits the multiple CSIs (i.e., CSI_CC1 1002, CSI_CC2 1004, CSI_CC3 1006, CSI_CC4 1008, and CSI_CC5 1010) in the current frames. Among CSI_CC1 1002, CSI_CC2 1004, CSI_CC3 1006, CSI_CC4 1008, and CSI_CC5 1010, the CSI for a predetermined reference component carrier is expressed with k1 bits, and the rest of component carriers CSIs are expressed with k2 bits of the difference value (hereinafter, referred to as differential CSI of component carrier) with the CSI of the reference component carrier. The eNB notifies the UE of the reference component carrier determined in advance. k1>k2 and a total number of CSI bits for all component carriers transmitted in the current subframe is equal to or less than the maximum number of bits, N, of control information that the UE can transmit in a subframe. Typically, k1 is 4 bits, and k2 is 2 bits. The differential CSI of the component carrier that is expressed by 2 bits calculated as above has the meanings as shown in table 1. For example, if the differential CSI of a certain component carrier is 2, the means that the CSI of the component carrier is greater than the CSI of the reference component carrier by as much as 2 or more.

TABLE 1

| Differential CSI of component carrier | Meaning |
| --- | --- |
| 0 | 0 |
| 1 | 1 |
| 2 | >=2 |
| 3 | <=-1 |

Although the differential CSI of the component carrier is expressed with 2 bits in this exemplary embodiment, the present invention is not limited thereto. That is, as the eNB notifies the UE via higher layer signaling, the differential CSI of the component carrier can be expressed with 4 bits. FIG. 10 shows the case where the component carrier#1 is configured as the reference component carrier such that its CSI is expressed with k1 bits and each of the CSIs of the remaining component carrier#2, component carrier#3, component carrier#4, and component carrier#5 is expressed with 2k bits as differential CSI so as to be joint-coded and then transmitted in the same subframe.

The CSI of the reference component carrier and the differential CSIs of the not-reference component carriers are joint-coded into the control information, and the positions of the CSI and differential CSIs of the respective component carriers are notified to the UE via explicit signaling of the eNB. Also, the CSI transmission order can be determined based on the frequencies of the component carriers, e.g., an ascending order of frequencies. In FIG. 10, the control information is configured in the order of CSI_CC1 1002, differential CSI_CC2 1004, differential CSI_CC3 1006, differential CSI_CC4 1008, and differential CSI_CC5 1010. At this time, the contents of the CSIs of the component carriers should be identical with each other. For example, the wideband CQI of the component carrier 1 is transmitted on CSI_CC1 1002, the UE should transmit the wideband CQIs of the component carrier 2, component carrier 3, component carrier 4, and component carrier 5 through differential CSI_CC2 1004, differential CSI_CC3 1006, differential CSI_CC4 1008, and differential CSI_CC5 1010.

The third exemplary embodiment can be modified in various manners.

Figure 11:
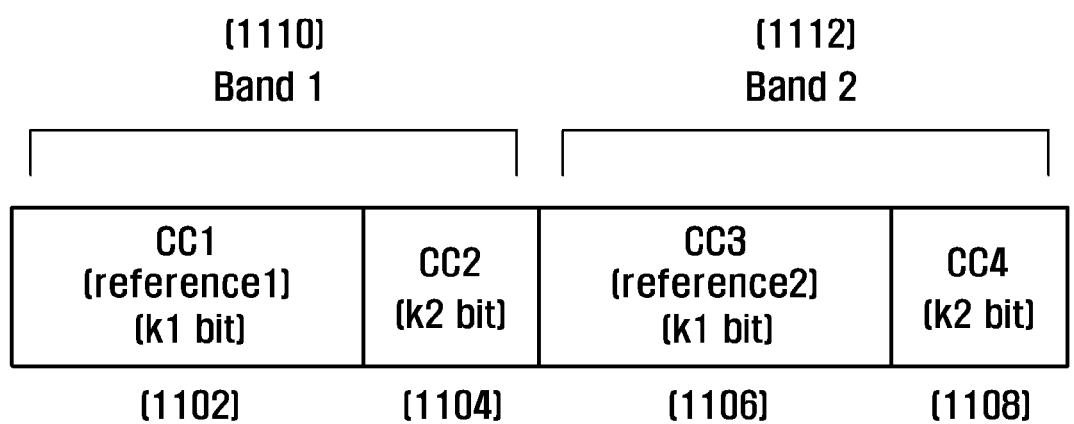
FIG. 11 is a diagram illustrating a data format of CSIs for component carriers for use in a CSI transmission method according to a modified example of the third exemplary embodiment of the present invention.

FIG. 11 is a diagram illustrating a data format of CSIs for component carriers for use in a CSI transmission method according to a modified example of the third exemplary embodiment of the present invention.

Referring to FIG. 11, two different frequency bands are assigned to the UE. The frequency band 1 1110 includes component carrier 1 and component carrier 2, and the frequency band 2 1112 includes component carrier 3 and component carrier 4. The difference between the CSIs of the two frequency bands is likely to be so great that, if the differential CSI is calculated between the component carriers belonging to different frequency bands, the CSIs are likely to be incorrect. In this case, it is done to select the reference component carrier per frequency band and express each of the CSIs of the reference component carriers with k1 bits and the differential CSI of the non-reference component carrier in the same frequency band with k2 bits.

That is, the UE configures the component carrier 1 as the reference component carrier in the frequency band 1 1110 and the component carrier 3 as the reference component carrier in the frequency band 2 1112 and generates the differential CSI of the component carrier 2 with respect to the component carrier 1 and the differential CSI of the component carrier 4 with respect to component carrier 3. Next, the UE configures the control information in an order of CSI_CC1 1102, differential CSI_CC2 1104, CSI_CC3 1106, and differential CSI_CC4 1108, and performs joint coding into the same subframe. The total number of bits of the CSIs of the component carriers in the current subframe is equal to or less than the maximum number of bits, N, of the control information that the UE can transmit in one subframe. The reference component carriers of the respective frequency bands are notified to the UE in advance. Similar to the case of FIG. 10, the position of CSI or differential CSI of each component carrier is notified to the UE by the eNB via explicit signaling or known to the UE implicitly according to the frequencies of the component carriers, e.g., according to an ascending order of frequencies.

Although the control information is established by a group composed of at least two component carriers in FIG. 11, the present invention is not limited thereto. That is, the control information can be established by a group composed of at least two component carriers according to the content of the CSI per component carrier. For example, in a case where the CSI_CC1 and CSI_CC3 carry the PMIs of the component carrier 1 and component carrier 3 respectively and the CSI_CC2 and CSI_CC4 carry the CQIs of the component carrier 2 and component carrier 4 respectively, the UE makes a group of CSI_CC1 and CSI_CC3 and another group of CSI_CC2 and CSI_CC4. At this time, the UE configures one of the component carriers 1 and 3 and one of the component carriers 2 and 4 as the reference component carriers of the respective groups.

Figure 12:
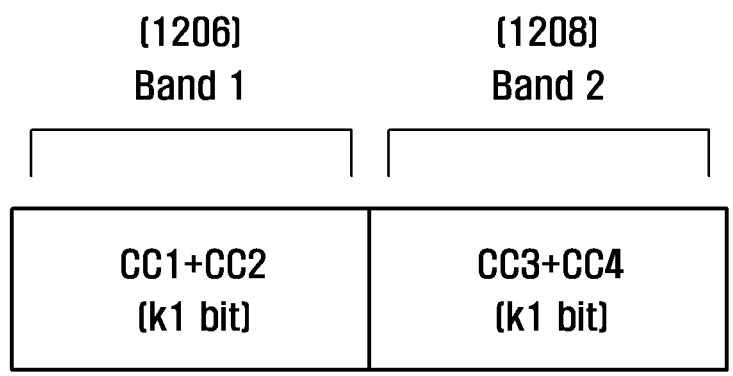
FIG. 12 is a diagram illustrating a data format of CSIs for component carriers for use in a CSI transmission method according to another modified example of the third exemplary embodiment of the present invention.

FIG. 12 is a diagram illustrating a data format of CSIs for component carriers for use in a CSI transmission method according to another modified example of the third exemplary embodiment of the present invention.

Referring to FIG. 12, the frequency band 1 1206 is composed of component carrier 1 and component carrier 2, and the frequency band 2 1208 is composed of component carrier 3 and component carrier 4. In a case where the difference between channel status information of the component carriers in the same frequency band, it is advantageous to transmit a value represented by k1 bits for indicating the CSIs of all of the component carriers constituting the frequency band, rather than transmit all of the CSIs of the respective component carriers, thereby reducing control information overhead. In the exemplary embodiment of FIG. 12, the CSIs of the component carriers 1 and 2 constituting the frequency band 1 1206 are indicated by a value of k1 bits, the CSIs of the component carriers 3 and 4 constituting the frequency band 2 are indicated by a value of k1 bits, and the values are joint-coded into control information to be transmitted in the same subframe. The total number of CSI bits transmitted in the current subframe is equal to or less than the maximum number of bits, N, of the control information that can be transmitted by the UE in one subframe. The positions of the CSIs for the respective frequency bands are notified to the UE by the eNB via explicit signaling or known to the UE implicitly according to the frequencies of the frequency bands assigned for the UE, e.g., ascending order of frequencies.

Fourth Exemplary Embodiment

The fourth exemplary embodiment proposes a method for the UE to feed back the CSIs of component carriers as their transmission time points are overlapped with the transmission time points of other control information. Although the description is directed to the case where the other control information is Acknowledgement/Negative Acknowledgement (ACK/NACK), the present invention is not limited thereto. In this exemplary embodiment, the method for transmitting the CSI and ACK/NACK is described with reference to FIG. 13.

Figure 13:
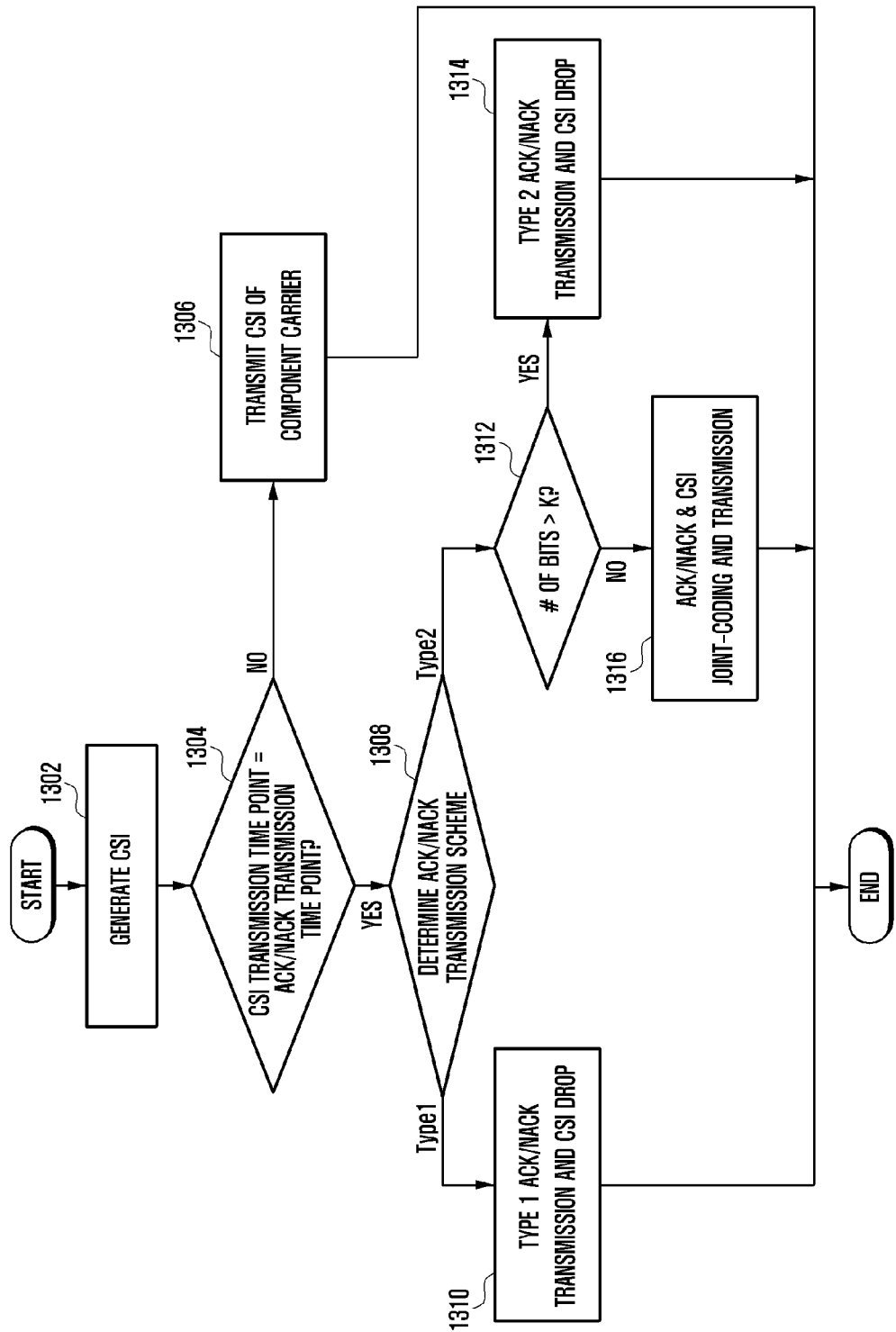
FIG. 13 is a flowchart illustrating a procedure for transmitting CSIs and Acknowledgement/Negative Acknowledgement (ACK/NACK) according to a fourth exemplary embodiment of the present invention.

FIG. 13 is a flowchart illustrating a procedure for transmitting CSIs and ACK/NACK according to a fourth exemplary embodiment of the present invention.

The procedure depicted in FIG. 3 can be applied to step 306 of FIG. 3.

Referring to FIG. 13, the UE calculates the CSI value of the component carrier to be transmitted in subframe#k according to predetermined CSI configuration information at step 1302. The CSI value can be of the CSI for one component carrier or the CSIs of multiple component carriers. Next, the UE determines whether to transmit ACK/NACK in subframe#k along with the CSI at step 1304. The ACK/NACK is fed back to the eNB in subframe#k, when downlink data is received in subframe#(k-n), in order to notify whether the downlink data is erroneous. Typically, n is 4 in an LTE system.

If there is no ACK/NACK to be transmitted in subframe#k, the UE transmits the CSI at step 1306. At this time, the CSI can be transmitted in a predetermined CSI pattern as described in the above-described exemplary embodiments.

Otherwise, if it is determined that there is ACK/NACK to be transmitted in subframe#k at step 1304, the UE determines the ACK/NACK transmission scheme at step 1308. At this time, the UE can use one of the two ACK/NACK transmission schemes according to the number of ACK/NACK bits to be transmitted. The number of ACK/NACK bits is determined according to the number of downlink component carriers and whether to use MIMO. For example, if the eNB transmits data using two downlink component carriers and if a MIMO scheme generates two codewords per component carrier, a total of 4 (2×2) data streams exist and thus the UE feeds back a total of 4 bits of ACK/NACK (1 bit per data stream) to the eNB. If the number of ACK/NACK bits is equal to or less than a predetermined number of bits J, the UE selects type 1 ACK/NACK transmission scheme, and otherwise selects type 2 ACK/NACK transmission scheme. The type 1 ACK/NACK transmission scheme is the combination of the ACK/NACK transmission resource assigned to the UE and constellation point of modulation symbol and can be a channel selection scheme expressing the ACK/NACK to be transmitted by the UE. The type 2 ACK/NACK transmission scheme is to perform joint coding on the ACK/NACK bits to be transmitted by the UE.

If the type 1 ACK/NACK transmission scheme is selected at step 1308, the UE transmits the ACK/NACK in subframe#k according to the type 1 ACK/NACK transmission scheme without transmission of CSI at step 1310. For example, when the ACK/NACK transmission scheme follows format 3, the UE drops the CSI and transmits only ACK/NACK.

If the type 2 ACK/NACK transmission scheme is selected at step 1308, the UE determines whether the total number of ACK/NACK and CSI bits to be transmitted is greater than a predetermined number of bits K at step 1312. That is, when the ACK/NACK transmission scheme follows a method other than format 3, e.g., format 1 or channel selection, the UE checks whether the ACK/NACK is composed of multiple bits or a single bit. If the total number of ACK/NACK and CSI bits to be transmitted is greater than a predetermined number of bits K, the UE transmits the ACK/NACK according to the type 2 ACK/NACK transmission scheme without CSI transmission at step 1314. That is, if ACK/NACK is composed of multiple bits, the UE drops the CSI and transmits only ACK/ANCK. If the total number of ACK/NACK and CSI bits to be transmitted is equal to or less than the predetermined number of bits K, the UE performs joint coding on ACK/NACK and CSI and transmits the joint-coded ACK/NACK and CSI at step 1316. That is, if ACK/NACK is composed of a single bit, the UE performs joint coding on the ACK/NACK and CSI to be transmitted.

Figure 14:
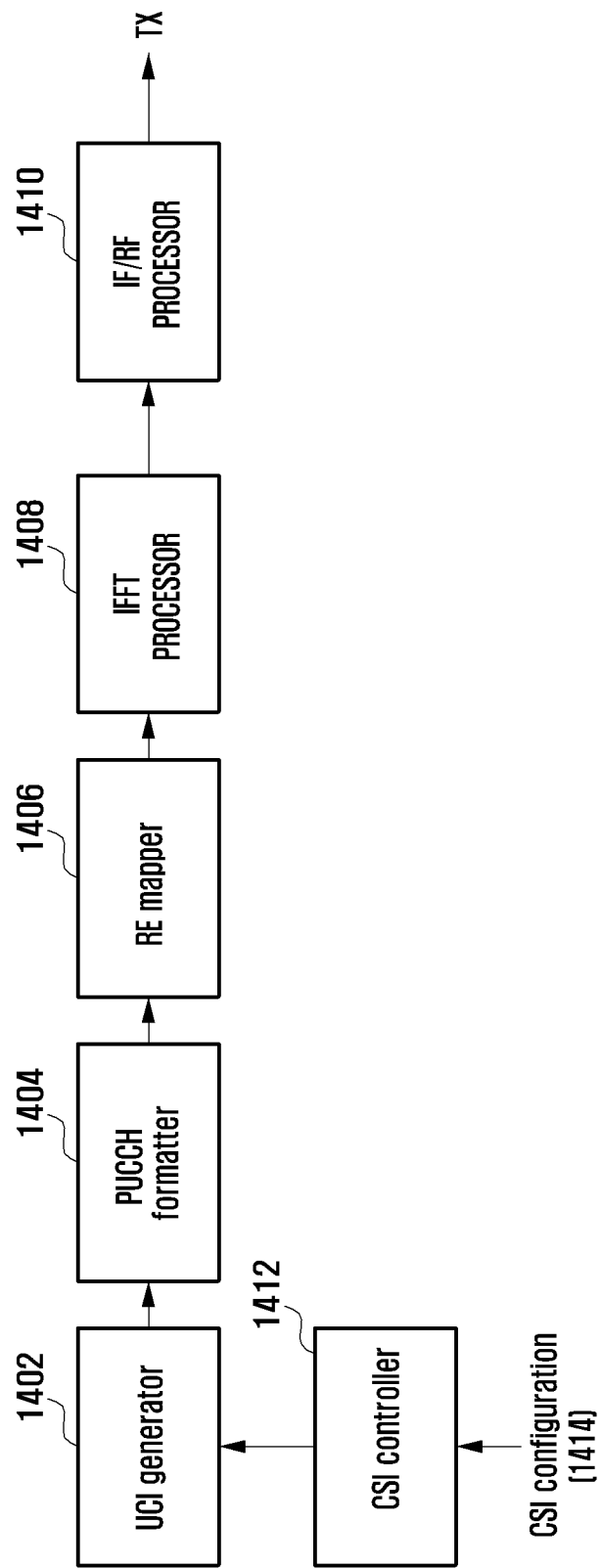
FIG. 14 is a block diagram illustrating a configuration of a UE for transmitting CSI on Physical Uplink Control Channel (PUCCH) according to an exemplary embodiment of the present invention.

FIG. 14 is a block diagram illustrating a configuration of a UE for transmitting CSI on PUCCH according to an exemplary embodiment of the present invention.

Referring to FIG. 14, the UE includes an Uplink Control Information (UCI) generator 1402, a PUCCH formatter 1404, a Resource Element (RE) mapper 1406, an Inverse Fast Fourier Transform (IFFT) processor 1408, an Intermediate Frequency (IF)/Radio Frequency (RF) processor 1410, and a CSI controller 1412.

The UCI generator 1402 generates uplink control information to be transmitted. The PUCCH formatter 1404 performs channel coding and modulation on the data to be suitable for PUCCH transmission. The RE mapper 1406 maps the signal to be transmitted to REs. Here, the UCI includes CSI indicating channel status and/or ACK/NACK on the received data. The IFFT processor 1408 and the IF/RF processor 1410 process the signal output by the RE mapper 1406 and transmit the signal to the eNB. The CSI controller 1412 acquires the information on the CSI transmission time points for individual component carriers from the CSI configuration information 1414 provided by the eNB and controls the UCI generator 1402 to generate and transmit the CSIs at configured time points.

That is, the CSI controller 1412 receives the CSI configuration information 1414 for aggregated component carriers from the eNB. The CSI controller 1412 analyzes the CSI configuration information 1414 to determine the CSI transmission pattern composed of CSI transmission time points of the component carriers. Here, the CSI controller 1412 can configure the CSI transmission pattern in which the CSI transmission time point of at least one of the component carriers repeats. The UCI generator 1402 transmits the CSIs at the corresponding transmission time points according to the CSI transmission pattern under the control of the CSI controller 1412. In a case where there are CSIs having the same transmission time points, the PUCCH formatter 1404 performs joint coding on the CSIs of the component carriers so as to be transmitted as compressed.

Figure 15:
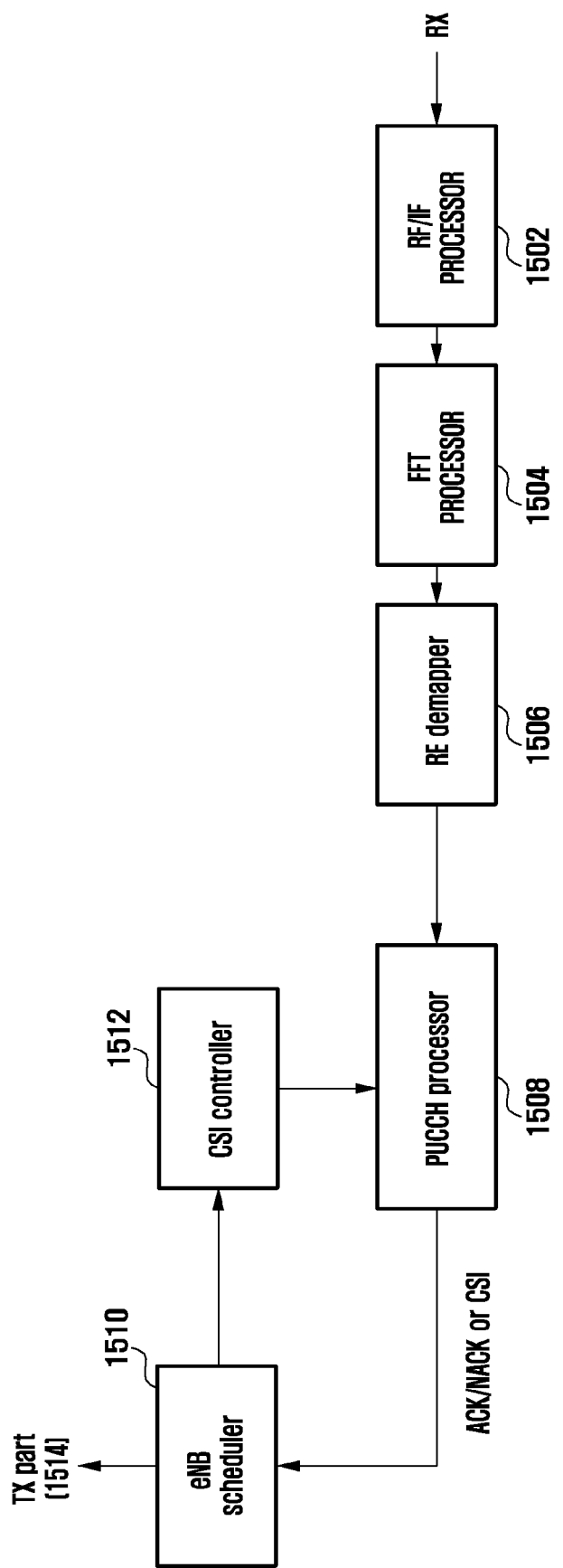
FIG. 15 is a block diagram illustrating a configuration of an eNB for receiving CSIs in PUCCH according to an exemplary embodiment of the present invention.

FIG. 15 is a block diagram illustrating a configuration of an eNB for receiving CSIs in PUCCH according to an exemplary embodiment of the present invention.

Referring to FIG. 15, the eNB includes an RF/IF processor 1502, a Fast Fourier Transform (FFT) processor 1504, an RE demapper 1506, a PUCCH processor 1508, an eNB scheduler 1510, and a CSI controller 1512.

The RF/IF processor 1502 performs RF/IF processing on the signal received from the UE. The FFT processor 1504 performs FFT processing on the output signal of the RF/IF processor 1502. The PUCCH processor 1508 performs signal processing according to whether the type of the UCI included in the PUCCH transmitted by the UE is CSI or ACK/NACK, and includes a decoder and demodulator (not shown). The eNB scheduler 1510 makes scheduling and transmission format decisions based on the CSI and/or ACK/NACK received from the PUCCH processor 1508 and controls an eNB transmitter 1514. The CSI controller 1512 receives the CSI configuration information of each UE from the eNB scheduler 1510 and controls the PUCCH processor 1508 to perform signal processing on the UCI to be received.

That is, the eNB scheduler 1510 generates the CSI configuration information for the UE to determine CSI transmission time points of individual component carriers aggregated for data transmission. The eNB scheduler 1510 transmits the CSI configuration information to the UE by means of the eNB transmitter 1514. The CSI controller 1512 controls to receive the CSIs transmitted by the UE at the corresponding CSI transmission time points. The PUCCH processor 1508 processes the CSIs under the control of the CSI controller 1512.

Figure 16:
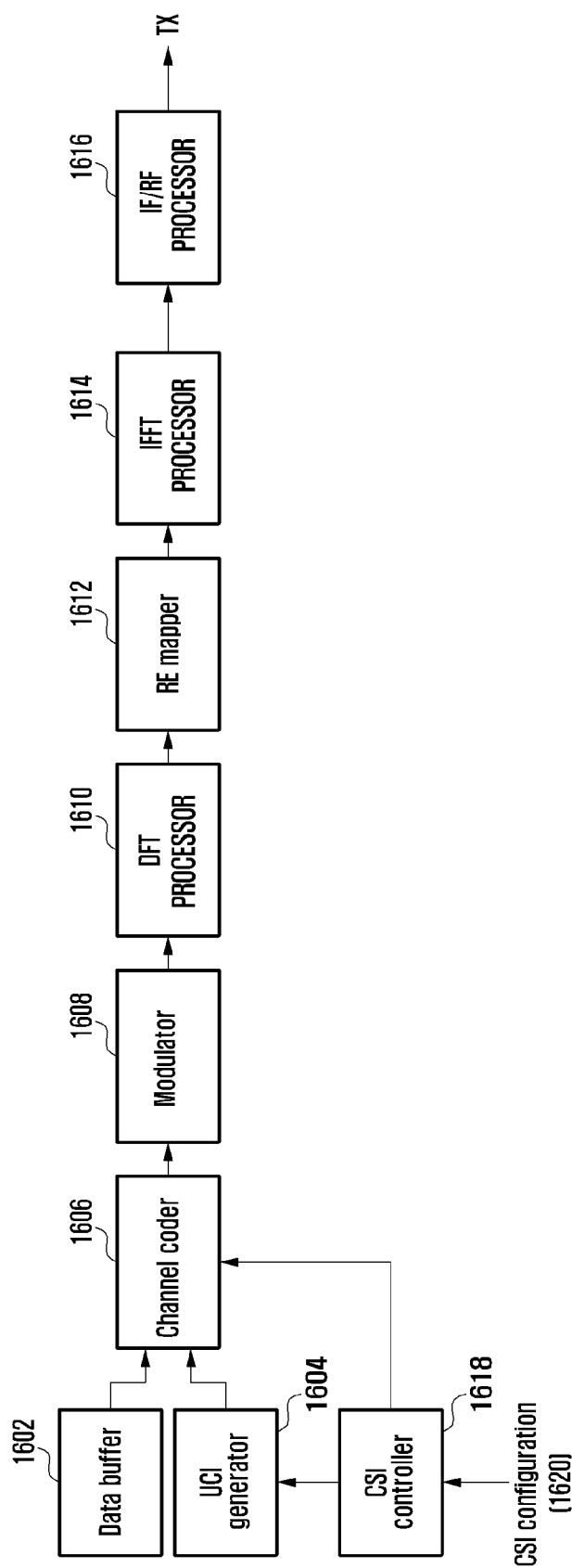
FIG. 16 is a block diagram illustrating a configuration of a UE for transmitting CSIs in Physical Uplink Shared Channel (PUSCH) according to an exemplary embodiment of the present invention.

FIG. 16 is a block diagram illustrating a configuration of a UE for transmitting CSIs in PUSCH according to an exemplary embodiment of the present invention.

Referring to FIG. 16, the UE includes a data buffer 1602, a UCI generator 1604, a channel coder 1606, a modulator 1608, a Discrete Fourier Transform (DFT) processor 1610, an RE mapper 1612, an IFFT processor 1614, an IF/RF processor 1616, and a CSI controller 1618.

The data buffer 1602 performs buffering of the data to be transmitted by the UE in uplink. The UCI generator 1604 generates uplink control information. The channel coder 1606 adds error correction capability to the data and UCI. The modulator 1608 modulates the data and UCI into modulation symbols. The DFT processor 1610 performs DFT processing on the transmit signal. The RE mapper 1612 maps the DFT output to REs. The IFFT processor 1614 and the IF/RF processor 1616 process the signal output from the RE mapper 1612 so as to be transmitted to the UE. The UCI includes the CSI indicating channel status and/or ACK/NACK on the data received from the eNB. The UCI and data are transmitted to the eNB in PUSCH. The CSI controller 1618 acquires CSI configuration information 1620 on the CSI transmission points of individual component carriers and controls the UCI generator 1604 to generate and transmit CSI at corresponding CSI transmission time points.

That is, the CSI controller 1618 receives the CSI configuration information 1620 for aggregated component carriers from the eNB. The CSI controller 1618 analyzes the CSI configuration information 1620 to determine the CSI transmission pattern composed of CSI transmission time points of the component carriers. Here, the CSI controller 1618 can configure the CSI transmission pattern in which the CSI transmission time point of at least one of the component carriers repeats. The UCI generator 1604 transmits the CSIs at the corresponding transmission time points according to the CSI transmission pattern under the control of the CSI controller 1618. In a case where there are CSIs having the same transmission time points, the channel coder 1606 performs joint coding on the CSIs of the component carriers so as to be transmitted as compressed.

Figure 17:
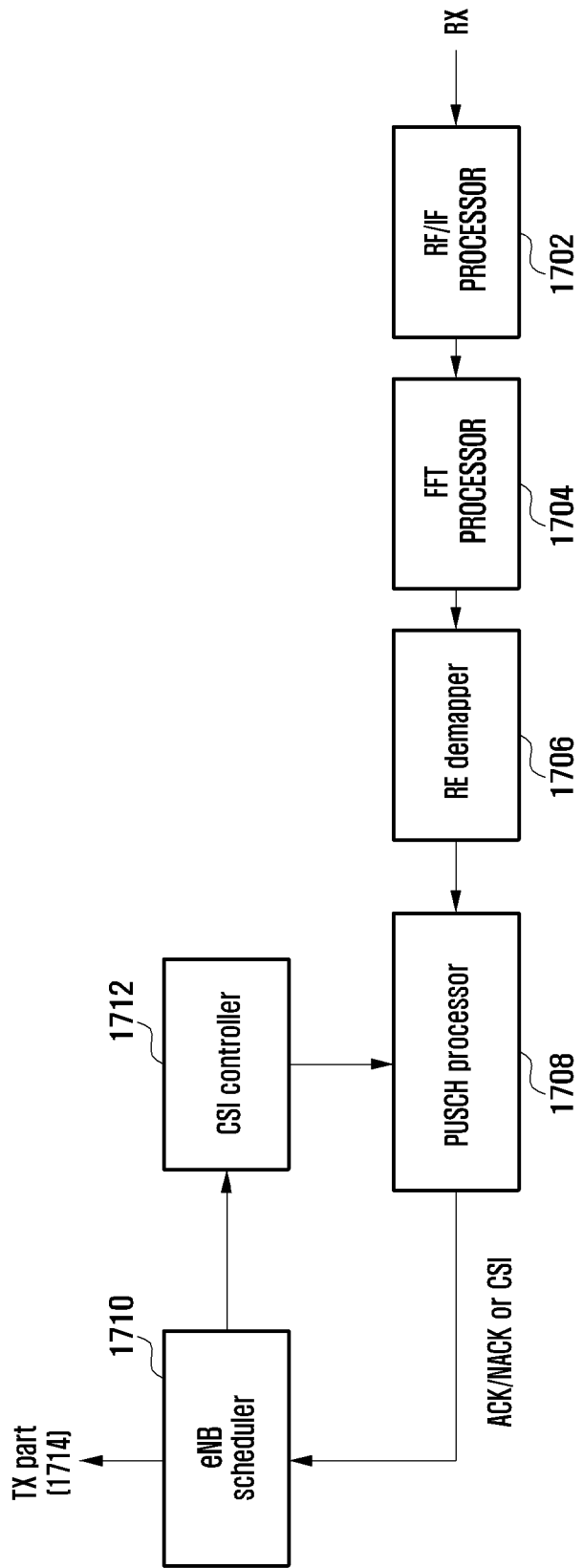
FIG. 17 is a block diagram illustrating a configuration of an eNB for receiving CSIs in PUSCH according to an exemplary embodiment of the present invention.

FIG. 17 is a block diagram illustrating a configuration of an eNB for receiving CSIs in PUSCH according to an exemplary embodiment of the present invention.

Referring to FIG. 17, the eNB includes an RF/IF processor 1702, an FFT processor 1704, an RE demapper 1706, a PUSCH processor 1708, an eNB scheduler 1710, and a CSI controller 1712.

The RF/IF processor 1702 performs RF/IF processing on the signal received from the UE. The FFT processor 1704 performs FFT processing on the output signal of the RF/IF processor 1702. The PUSCH processor 1708 performs signal processing according to the data, CSI, and/or ACK/NACK transmitted by the UE in PUSCH, and includes a decoder and demodulator (not shown). The eNB scheduler 1710 makes scheduling and transmission format decisions based on the CSI and/or ACK/NACK received from the PUSCH processor 1708 and controls an eNB transmitter 1714. The CSI controller 1712 receives the CSI configuration information of each UE from the eNB scheduler 1710 and controls the PUSCH processor 1708 to perform signal processing on the UCI to be received.

That is, the eNB scheduler 1710 generates the CSI configuration information for the UE to determine CSI transmission time points of individual component carriers aggregated for data transmission. The eNB scheduler 1710 transmits the CSI configuration information to the UE by means of the eNB transmitter 1714. The CSI controller 1712 controls to receive the CSIs transmitted by the UE at the corresponding CSI transmission time points. The PUSCH processor 1708 processes the CSIs under the control of the CSI controller 1712.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A Channel Status Information (CSI) transmission method of a terminal in a wireless communication system supporting carrier aggregation, the method comprising:
  receiving CSI configuration information for a plurality of component carriers from a base station, the plurality of component carriers comprising a first component carrier and a second component carrier;
  determining whether CSI transmission time of the first component carrier and CSI transmission time of the second component carrier are identical based on analyzing the configuration information;
  transmitting, if other information to be transmitted at the CSI transmission time exists, the other information without the CSI at the CSI transmission time;

identifying, if the other information to be transmitted at the CSI transmission time does not exist, whether the CSI transmission time of the first and second component carriers are identical and the first component carrier and the second component carrier have different priorities; and transmitting, if the CSI transmission time of the first and second component carriers are identical and the first component carrier and the second component carrier have different priorities, a CSI of a component carrier having a highest priority at the transmission time.

2. The method of claim 1, wherein the other information is composed of multiple bits.

3. The method of claim 1, wherein the other information is ACK/NACK information.

4. The method of claim 1,
wherein data is aggregated and transmitted per component carrier, and
wherein the CSI configuration information is defined per component carrier.

5. A Channel Status Information (CSI) reception method of a base station in a wireless communication system supporting carrier aggregation, the method comprising:
transmitting CSI configuration information on a plurality of component carriers, the plurality of component carriers comprising a first component carrier and a second component carrier;
receiving,
if other information to be transmitted at the CSI transmission time exists, the other information without the CSI at the CSI transmission time; and
receiving, if the other information to be transmitted at the CSI transmission time does not exist and if the CSI transmission time of the first and second component carriers are identical and the first component carrier and the second component carrier have different priorities, a CSI generated for a component carrier having a highest priority at the transmission time.

6. The method of claim 5, wherein the other information is composed of multiple bits.

7. The method of claim 5, wherein the other information is ACK/NACK information.

8. The method of claim 5,
wherein data is aggregated and transmitted per component carrier, and
wherein the CSI configuration information is defined per component carrier.

9. An apparatus for transmitting Channel Status Information (CSI) for a terminal in a wireless communication system supporting carrier aggregation, the apparatus comprising:
a controller configured to:
receive CSI configuration information for a plurality of component carriers from a base station, the plurality of component carriers comprising a first component carrier and a second component carrier, determine whether CSI transmission time of the first component carrier and CSI transmission time of the second component carrier are identical based on analyzing the configuration information, and identify, if other information to be transmitted at the CSI transmission time does not exist, whether the CSI transmission time of the first and second component carriers are identical and the first component carrier and the second component carrier have different priorities; and a formatter configured to:
transmit, if the other information to be transmitted at the CSI transmission time exists, the other information without the CSI at the CSI transmission time, and transmit, if the CSI transmission time of the first and second component carriers are identical and the first component carrier and the second component carrier have different priorities, a CSI generated for a component carrier having a highest priority at the transmission time.

10. The apparatus of claim 9, wherein the other information is composed of multiple bits.

11. The apparatus of claim 9, wherein the other information is ACK/NACK information.

12. The apparatus of claim 9,
wherein data is aggregated and transmitted per component carrier, and
wherein the CSI configuration information is defined per component carrier.

13. An apparatus for receiving Channel Status Information (CSI) for a base station in a wireless communication system supporting carrier aggregation, the apparatus comprising:
a scheduler configured to transmit CSI configuration information for a plurality of component carriers, the plurality of component carriers comprising a first component carrier and a second component carrier; and
a controller configured to:
receive, if other information to be transmitted at the CSI transmission time exists, the other information without the CSI at the CSI transmission time, and receive, if the other information to be transmitted at the CSI transmission time does not exist and the CSI transmission time of the first and second component carriers are identical and the first component carrier and the second component carrier have different priorities, a CSI of a component carrier having a highest priority at the transmission time.

14. The apparatus of claim 13, wherein the other information is composed of multiple bits.

15. The apparatus of claim 13, wherein the other information is ACK/NACK information.

16. The apparatus of claim 13,
wherein data is aggregated and transmitted per component carrier, and
wherein the CSI configuration information is defined per component carrier.

* * * * *